United States Patent
Gate et al.

(10) Patent No.: US 11,644,830 B1
(45) Date of Patent: May 9, 2023

(54) AUTONOMOUS VEHICLE REMOTE TELEOPERATIONS SYSTEM WITH SCENARIO SELECTION

(71) Applicant: Aurora Innovation, Inc., Palo Alto, CA (US)

(72) Inventors: Gwennael Herve Jonathan Gate, Pittsburgh, PA (US); Dmitriy Kislovskiy, Pittsburgh, PA (US); Narek Melik-Barkhudarov, Edgewood, CA (US); Nathaniel Gist, IV, Pittsburgh, PA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 262 days.

(21) Appl. No.: 16/918,528

(22) Filed: Jul. 1, 2020

Related U.S. Application Data

(60) Provisional application No. 63/033,420, filed on Jun. 2, 2020.

(51) Int. Cl.
  *G05D 1/00* (2006.01)
  *B60W 60/00* (2020.01)
(52) U.S. Cl.
  CPC ....... *G05D 1/0033* (2013.01); *B60W 60/0011* (2020.02); *B60W 60/0025* (2020.02)
(58) Field of Classification Search
  CPC ......... B60W 2556/45; B60W 60/0025; B60W 60/0011; G05D 1/0033
  See application file for complete search history.

(56) References Cited

U.S. PATENT DOCUMENTS

| | | | |
|---|---|---|---|
| 9,507,346 B1 | 11/2016 | Levinson | |
| 10,884,424 B2 | 1/2021 | Creusot | |
| 10,921,817 B1 | 2/2021 | Kangaspunta | |
| 10,976,732 B2 | 4/2021 | Lockwood | |
| 11,016,485 B2 | 5/2021 | Pedersen et al. | |
| 2015/0248131 A1* | 9/2015 | Fairfield | B60W 30/00 701/2 |
| 2018/0364704 A1 | 12/2018 | Liu | |
| 2019/0011910 A1 | 1/2019 | Lockwood et al. | |
| 2019/0042859 A1* | 2/2019 | Schubert | G05D 1/0088 |
| 2019/0272433 A1 | 9/2019 | Yu | |
| 2019/0286151 A1* | 9/2019 | Palanisamy | G08G 1/096816 |

(Continued)

OTHER PUBLICATIONS

Canadian Patent Application No. 3,120,270 filed May 31, 2021 titled Autonomous Vehicle Teleoperations System.

(Continued)

*Primary Examiner* — Jonathan L Sample
*Assistant Examiner* — Elizabeth Rose Neleski
(74) *Attorney, Agent, or Firm* — Gray Ice Higdon

(57) ABSTRACT

A teleoperations system may be used to select from among multiple scenarios generated by an autonomous vehicle based upon context data provided to the teleoperations system by the autonomous vehicle. Furthermore, an autonomous vehicle may validate a selected scenario prior to executing that scenario to confirm that the scenario does not violate any vehicle and environmental constraints for the autonomous vehicle. Further, a user interface may be presented to a teleoperations system operator to coordinate the display representations of different scenarios with those of the user interface controls used to select such scenarios.

28 Claims, 6 Drawing Sheets

(56) References Cited

U.S. PATENT DOCUMENTS

| | | | |
|---|---|---|---|
| 2019/0354111 A1 | 11/2019 | Chen | |
| 2020/0132488 A1* | 4/2020 | Slutskyy | ............ B60W 60/0011 |
| 2020/0142417 A1* | 5/2020 | Hudecek | ........... B60W 30/0953 |
| 2020/0175326 A1 | 6/2020 | Shen | |
| 2020/0183394 A1 | 6/2020 | Lockwood et al. | |
| 2020/0307568 A1* | 10/2020 | Takahashi | ............... B60R 11/04 |
| 2020/0409352 A1 | 12/2020 | Caldwell | |
| 2020/0409368 A1 | 12/2020 | Caldwell | |
| 2021/0042535 A1 | 2/2021 | Abbott | |
| 2021/0078602 A1* | 3/2021 | Wray | .................. H04L 63/1425 |
| 2021/0097304 A1 | 4/2021 | Agrawal | |
| 2021/0116907 A1 | 4/2021 | Altman | |
| 2021/0300422 A1* | 9/2021 | McGill | ............... B60W 30/095 |
| 2021/0316763 A1* | 10/2021 | Domahidi | ........... B60W 40/105 |
| 2021/0325880 A1 | 10/2021 | Gogna | |

OTHER PUBLICATIONS

U.S. Appl. No. 16/918,519, filed Jul. 1, 2020 titled Autonomous Vehicle Teleoperations System.
U.S. Appl. No. 16/918,525, filed Jul. 1, 2020 titled Autonomous Vehicle Remote Teleoperations System.
United States Patent and Trademark Office, Non-Final Office Action for U.S. Appl. No. 16/918,519 dated Apr. 19, 2022, 46 pages.
United States Patent and Trademark Office, Non-Final Office Action for U.S. Appl. No. 16/918,525 dated May 12, 2022, 29 pages.

\* cited by examiner

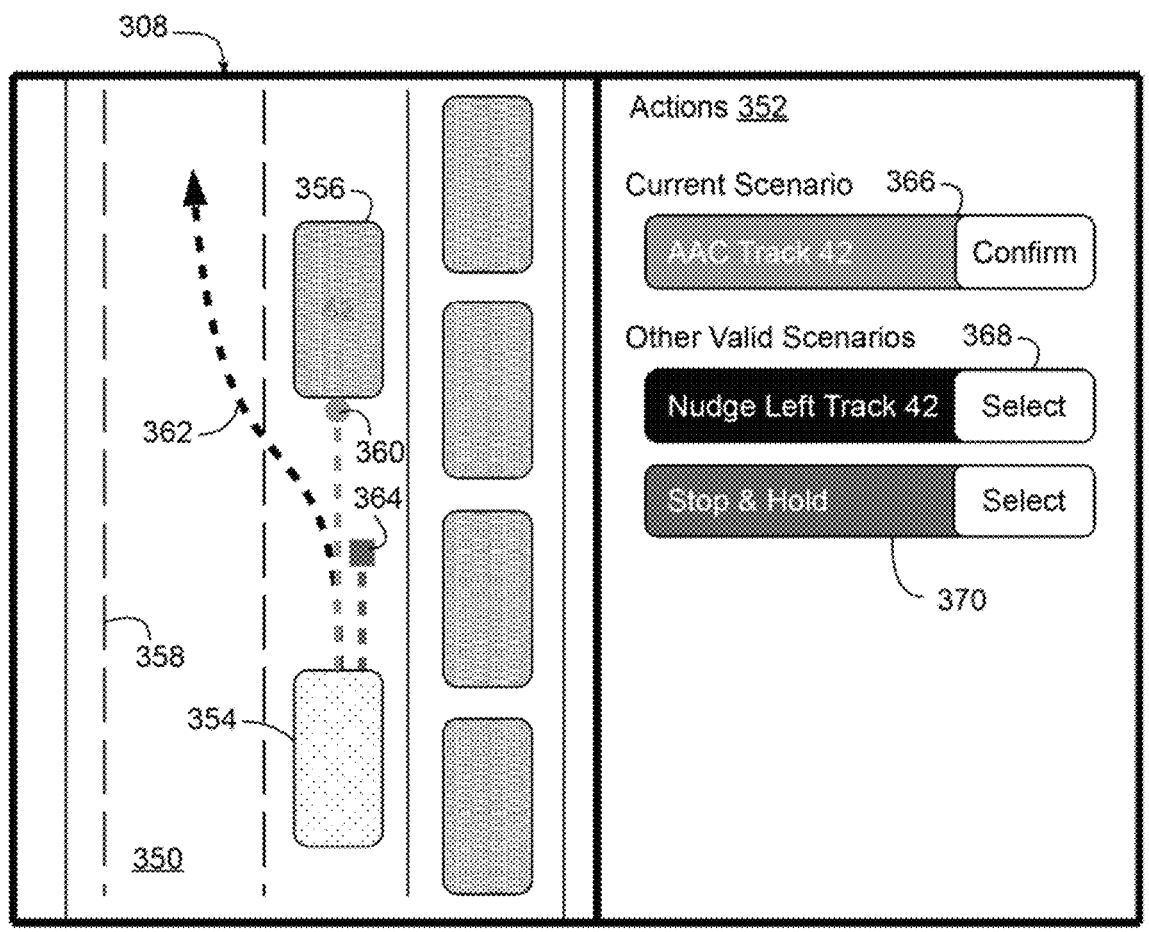

AUTONOMOUS VEHICLE REMOTE TELEOPERATIONS SYSTEM WITH SCENARIO SELECTION

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

It has also been proposed to utilize teleoperations to complement vehicle autonomy, particularly for use in connection with handling certain irregular conditions that an autonomous vehicle may encounter within an environment. Events such as construction-related lane or road closures, funeral processions, emergency vehicles, loading or unloading school buses, crossing guards, police officers directing traffic, etc., while potentially uncommon, will still inevitably be encountered by autonomous vehicles from time to time, thus requiring autonomous vehicles to handle such events in a safe and reliable manner. With teleoperations, a remote system or operator may be placed in communication with an autonomous vehicle to assist with resolving any such events, and as such, it is desirable for a teleoperations system to efficiently and reliably support teleoperations for autonomous vehicles.

SUMMARY

The present disclosure is related to facilitating interaction between an autonomous vehicle and a teleoperations system. A teleoperations system may be used in some implementations to select from among multiple scenarios generated by an autonomous vehicle based upon context data provided to the teleoperations system by the autonomous vehicle. Furthermore, in some instances, an autonomous vehicle may validate a selected scenario prior to executing that scenario to confirm that the scenario does not violate any vehicle constraints for the autonomous vehicle. Further, in some instances, a user interface may be presented to a teleoperations system operator to coordinate the display representations of different scenarios with those of the user interface controls used to select such scenarios.

Therefore, consistent with one aspect of the invention, a method may include generating a plurality of scenarios in an autonomous vehicle operating in an environment, communicating the plurality of scenarios to a teleoperations system in communication with and remote from the autonomous vehicle, communicating to the teleoperations system context data collected by the autonomous vehicle from the environment in which the autonomous vehicle operates to provide situational awareness to the teleoperations system, receiving from the teleoperations system a selected scenario selected by the teleoperations system, and causing the autonomous vehicle to execute the selected scenario in response to receiving the selected scenario.

In addition, some implementations may also include validating the selected scenario received from the teleoperations system in the autonomous vehicle, where causing the autonomous vehicle to execute the selected scenario is performed in response to successful validation of the selected scenario, and in response to unsuccessful validation of the selected scenario by the autonomous vehicle, rejecting the selected scenario in the autonomous vehicle. Some implementations may further include communicating a notification to the teleoperations system in response to unsuccessful validation of the selected scenario.

In addition, in some implementations, validating the selected scenario includes determining if the selected scenario contradicts a different scenario being executed by the autonomous vehicle. In addition, some implementations may also include initiating execution of the different scenario by the autonomous vehicle after communicating the plurality of scenarios to the teleoperations system but before receiving the selected scenario from the teleoperations system. Further, in some implementations, validating the selected scenario includes determining whether a path associated with the selected scenario violates any constraint associated with the autonomous vehicle.

In addition, in some implementations, the constraint is a mapping constraint that restricts vehicle travel within a geographical area. Also, in some implementations, the constraint is a perception constraint. Some implementations may also include validating each scenario of the plurality of planning scenarios prior to communicating the plurality of scenarios to the teleoperations system. Also, in some implementations, the selected scenario is different from the plurality of scenarios. In some implementations, the selected scenario is a stop and hold scenario or a release hold scenario. In addition, in some implementations, the selected scenario is selected from the plurality of scenarios. Further, in some implementations, generating the plurality of scenarios includes ranking the plurality of scenarios, and the selected scenario is of a lower rank than a top ranked scenario of the plurality of scenarios.

Some implementations may also include re-ranking at least a subset of the plurality of scenarios in response to receiving the selected scenario. Moreover, in some implementations, generating the plurality of scenarios is performed using a trained machine learning model, and the method further includes generating training data for the trained machine learning model in response to receiving the selected scenario. Some implementations may further include notifying another autonomous vehicle in response to receiving the selected scenario. In addition, in some implementations, communicating the context data to the teleoperations system includes communicating autonomy, sensor, telemetry and/or video data to the teleoperations system.

Consistent with another aspect of the invention, a method may include, in a teleoperations system in communication with an autonomous vehicle operating in an environment and remote from the teleoperations system, receiving from the autonomous vehicle a plurality of scenarios generated by the autonomous vehicle, in the teleoperations system, presenting to a teleoperations system operator context data collected by the autonomous vehicle from the environment in which the autonomous vehicle operates and a graphical display representation of at least a subset of the plurality of scenarios to provide situational awareness to the teleoperations system operator, in the teleoperations system, receiving input from the teleoperations system operator selecting a selected scenario, and communicating the selected scenario to the autonomous vehicle to cause the autonomous vehicle to execute the selected scenario.

Some implementations may also include presenting to the teleoperations system operator a plurality of user controls, each user control of the plurality of user controls associated with a scenario of the plurality of scenarios, and where the input selecting the selected scenario includes input selecting the user control of the plurality of user controls that is associated with the selected scenario. In some implementations, presenting the plurality of user controls includes presenting each user control of the plurality of user controls with a color or pattern that visually associates such user control with its associated scenario in the graphical display representation. In addition, some implementations may further include presenting to the teleoperations system operator at least one additional user control associated with a scenario that is different from the plurality of scenarios.

In addition, in some implementations, the graphical display representation includes an overhead map view including a graphical representation of the autonomous vehicle, a graphical representation of one or more static objects in the environment in which the autonomous vehicle is operating, a graphical representation of one or more dynamic objects in the environment in which the autonomous vehicle is operating, and a graphical representation of one or more boundaries in the environment in which the autonomous vehicle is operating. In some implementations, the graphical display representation further includes a graphical representation of a path of each scenario of the at least a subset of the plurality of scenarios.

Some implementations may also include a system that is remotely located from an autonomous vehicle and includes one or more processors that are configured to perform various of the methods described above. Some implementations may also include an autonomous vehicle control system including one or more processors, a computer readable storage medium, and computer instructions resident in the computer readable storage medium and executable by the one or more processors to perform various of the methods described above. Still other implementations may include a non-transitory computer readable storage medium that stores computer instructions executable by one or more processors to perform various of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6 illustrates an example implementation of a motion planning process utilized in the system of FIGS. 2-3.

FIG. 7 illustrates an example implementation of the features panel of the teleoperations user interface of FIG. 5.

DETAILED DESCRIPTION

The various implementations discussed hereinafter are generally directed to a teleoperations system for use with an autonomous vehicle. Prior to a discussion of these implementations, however, an example hardware and software environment within which the various techniques disclosed herein may be implemented will be discussed.

Hardware and Software Environment

Figure 1:
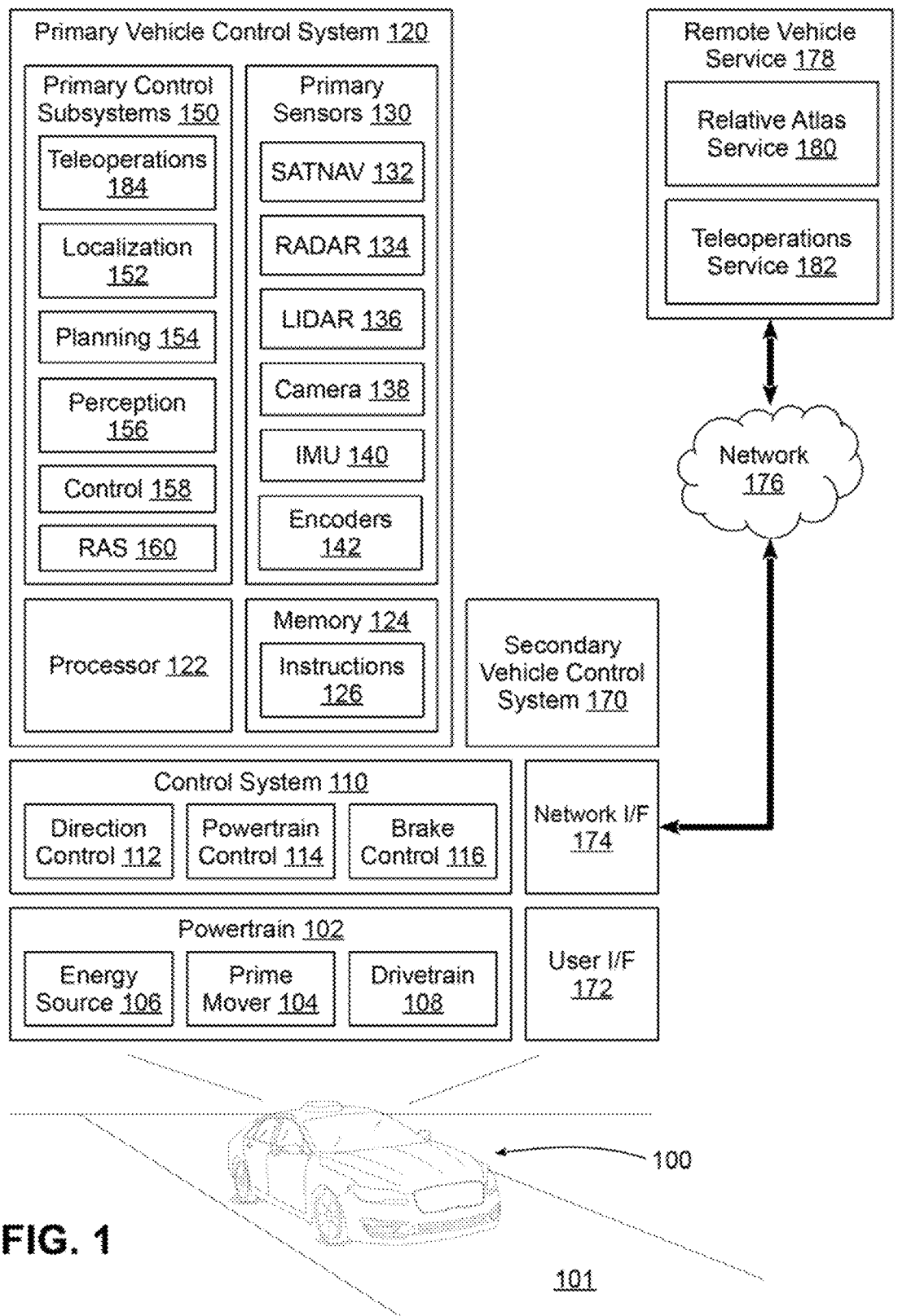
FIG. 1 illustrates an example hardware and software environment for an autonomous vehicle.

Turning to the Drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as a digital camera 138 (which may include various types of image capture devices capable of capturing still and/or video imagery), may be used to sense stationary and moving objects within the immediate vicinity of a vehicle. An inertial measurement unit (IMU) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, and a control subsystem 158. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. Planning subsystem 154 is principally responsible for planning a path of motion for vehicle 100 over some timeframe given a desired destination as well as the static and moving objects within the environment, while perception subsystem 156 is principally responsible for detecting, tracking and/or identifying elements within the environment surrounding vehicle 100. Control subsystem 158 is principally responsible for generating suitable control signals for controlling the various controls in control system 110 in order to implement the planned path of the vehicle. Any or all of localization subsystem 152, planning subsystem 154, perception subsystem 156, and control subsystem 158 may have associated data that is generated and/or utilized in connection with the operation thereof, and that which may be communicated to a teleoperations system in some implementations.

In addition, a Relative Atlas Subsystem (RAS) 160 may be provided in the illustrated implementations to describe the elements within an environment and the relationships therebetween. RAS 160 may be accessed by each of the localization, planning and perception subsystems 152-156 to obtain various information about the environment for use in performing their respective functions. RAS 160 may be used to provide mapping data to the autonomous vehicle control system, which may be used for various purposes in an autonomous vehicle, including for localization, planning, and perception, among other purposes. Mapping data may be used, for example, to lay out or place elements within a particular geographical area, including, for example, elements that represent real world objects such as roadways, boundaries (e.g., barriers, lane dividers, medians, etc.), buildings, traffic devices (e.g., traffic signs, lights, etc.), as well as elements that are more logical or virtual in nature, e.g., elements that represent valid pathways a vehicle may take within an environment (referred to hereinafter as "gates"), "virtual" boundaries such as lane markings, or elements that represent logical collections or sets of other elements. Mapping data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In the illustrated implementation, RAS 160 may provide mapping data in a format in which the positions of at least some of the elements in a geographical area are defined principally based upon relative positioning between elements rather than any absolute positioning within a global coordinate system. It will be appreciated, however, that other atlas or mapping systems suitable for maintaining mapping data for use by autonomous vehicles may be used in other implementations, including systems based upon absolute positioning, so the invention is not limited to use with the particular relative atlas system disclosed herein. Furthermore, it will be appreciated that at least some of the mapping data that is generated and/or utilized by RAS 160 may be communicated to a teleoperations system in some implementations.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating autonomous vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 178 including, at least for the purposes of implementing various functions described herein, a relative atlas service 180 and a teleoperations service 182. Relative atlas service 180 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Teleoperations service 182 may be used, for example, to provide teleoperations support to vehicle 100, e.g., through communication with a teleoperations subsystem 184 resident in primary vehicle control system 120, as will be discussed in greater detail below.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Teleoperations System

Operating an autonomous vehicle in the complex and dynamic environments within which automobiles regularly operate often necessitates handling a diverse array of conditions that, while comparatively uncommon, are still regularly encountered by many autonomous vehicles over time. Autonomously handling these uncommon conditions in both a performant and safe way can be challenging, and some proposed approaches to addressing these uncommon conditions incorporate the use of teleoperations, or "human-in-the-loop" technology, to enable a human operator, who may be remote from the vehicle, to make decisions and assist in guiding a vehicle whenever some of these uncommon conditions are encountered by the vehicle.

Some proposed teleoperations approaches focus on direct control of a vehicle by a remote operator, whereby the operator is provided with sensor data collected by the vehicle and is able to directly control the vehicle from a remote location. It has been found, however, that direct control of a vehicle in such circumstances generally requires a fast, responsive and reliable network connection between the remote operator and the autonomous vehicle. Network connectivity and latency for an autonomous vehicle, however, can vary considerably based upon location (e.g., urban or rural, highway or side road, etc.) and network congestion. In addition, remote operators, even when provided with sensor data collected by a vehicle, may still lack full situational awareness due to the fact that they are not physically within the vehicle.

The disclosed implementations, on the other hand, focus on an indirect control methodology whereby a teleoperations service is able to provide suggestions or recommendations to an autonomous vehicle, while requiring any such directives or recommendations to be validated by the autonomous vehicle prior to being implemented. By doing so, safety and/or performance of the vehicle may be effectively decoupled from the performance of the network that links the teleoperations service with the autonomous vehicle.

Figure 2:
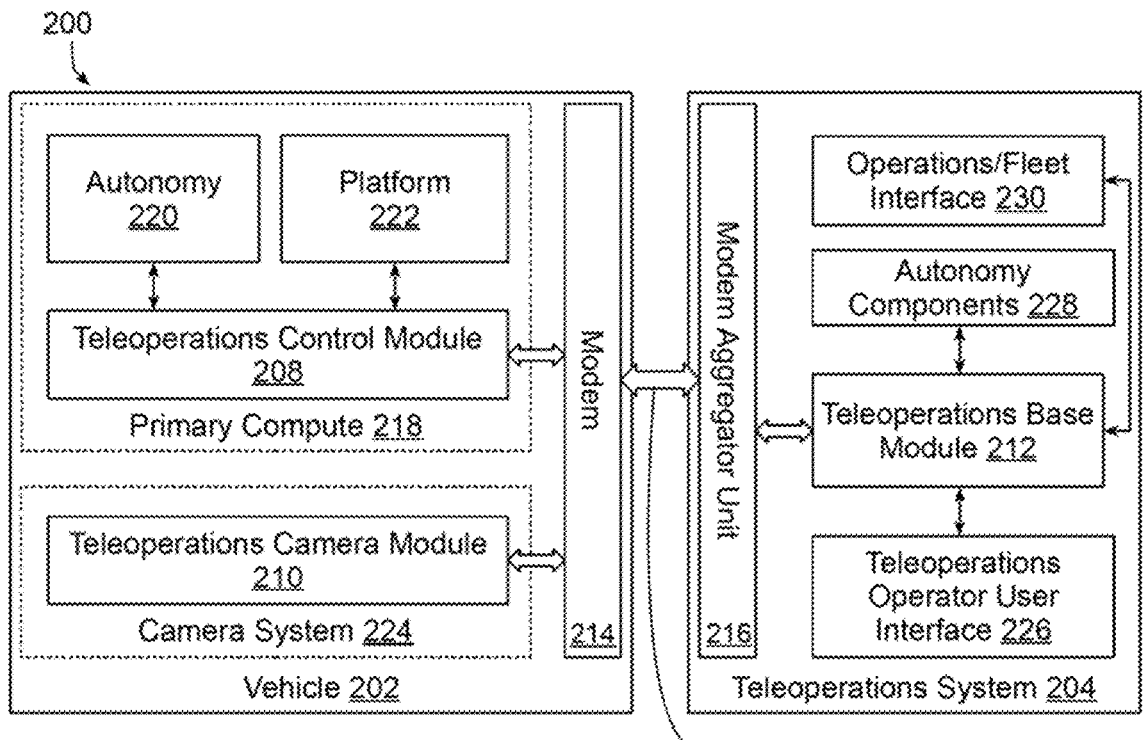
FIG. 2 is a block diagram illustrating an example implementation of a teleoperations-enabled system consistent with some implementations.

FIG. 2, for example, illustrates one example implementation of a teleoperations-enabled system or service 200 whereby an autonomous vehicle 202 is interfaced with a remote teleoperations system 204 over a network 206. Remote teleoperations system 204 may be physically remote from autonomous vehicle 202, and will generally support interface with multiple vehicles to enable multiple teleoperations operators to concurrently interact with multiple vehicles. As will become more apparent below, teleoperations operators may actively and continuously monitor individual vehicles in some implementations, while in other implementations, individual teleoperations operators may interact with multiple vehicles at different times, e.g., so that a particular operator may support multiple vehicles at one time. In some implementations, for example, teleoperations operators may be selectively coupled to particular autonomous vehicles on an on-demand basis, e.g., in response to requests generated by the vehicles whenever certain conditions (e.g., various uncommon situations that may benefit from teleoperations support) arise. In some implementations, a pool of operators may support a pool of autonomous vehicles, and a teleoperations system may initiate teleoperations sessions on an on-demand basis, e.g., based upon requests initiated by autonomous vehicles, the teleoperations system, or both.

Teleoperations support may be principally implemented in some implementations using a teleoperations control module 208 and a teleoperations camera module 210 in autonomous vehicle 202 in communication with a teleoperations base module 212 in teleoperations system 204. Modules 208 and 210 of vehicle 202 may be coupled to network 206 through a modem 214, while module 212 of teleoperations system 204 may be coupled to network 206 through a modem aggregator unit 216 capable of communicating with multiple modems 214 of multiple autonomous vehicles 202. Network 206 may be implemented in part using a wireless network such as a 4G, LTE or 5G network, a satellite network, or some combination thereof, although the invention is not so limited.

Teleoperations control module 208 may be resident in some implementations within a primary compute system 218 of vehicle 202, and may interface with each of an autonomy system 220 and platform 222 of the vehicle to collect and stream data from the primary compute system to teleoperations system 204 as well as receive and process operator inputs received from teleoperations system 204. In some implementations, primary compute system 218 may be implemented in a similar manner to primary vehicle control system 120 illustrated in FIG. 1, with autonomy system 220 representing high level autonomous control subsystems such as localization, planning, perception, etc., and with platform 222 representing lower level vehicle controls such as provided by control subsystem 158. However, it will be appreciated that teleoperations control module 208 may interface with practically any autonomy or control-related aspect of vehicle 202 in other implementations.

Teleoperations camera module 210 may be resident in some implementations within a camera system 224 that manages the on-board cameras on vehicle 202, and module 210 may, in some implementations, stream camera feed data collected from the on-board cameras to teleoperations system 204 for viewing by an operator during a teleoperations session. As will become more apparent below, in some implementations module 210 may dynamically vary the data streamed from the on-board cameras, e.g., to vary the priority, quality and/or resolution of each camera feed.

While modules 208 and 210 are implemented separately in FIG. 2, in other implementations, the functionality allocated to each module may vary, or the functionality may be combined into a single module or split into more than two modules. As such, the invention is not limited to the particular architecture illustrated in FIG. 2.

Teleoperations base module 212 communicates with modules 208 and 210 during a teleoperations session with vehicle 202, and may further manage multiple sessions for multiple vehicles and with multiple operators. Module 212 may also manage scheduling, initiation and termination of sessions in some implementations.

A teleoperations operator user interface 226 is coupled to module 212 to provide a user interface through which an operator, e.g., a human operator, may communicate with a vehicle 202 during a session. The user interface may be implemented in any number of suitable manners, and may utilize text, graphics, video, audio, virtual or augmented reality, keyboard input, mouse input, touch input, voice input, gesture input, etc. Dedicated or customized controls and/or indicators may also be used in some implementations. In addition, in some implementations an application, e.g., as may execute on a desktop computer or laptop computer, a mobile device, etc. may be utilized to interact with an operator, while in other implementations a web-based or remote interface may be used. In one example implementation discussed in greater detail below, for example, interface 226 may be a web-based interface that interacts with an operator via a touchscreen display.

Teleoperations system 204 may also include one or more autonomy components 228 interfaced with module 212. Autonomy components 228 may include various components that replicate the functionality of similar components in vehicle 202 and/or that are also accessible to a vehicle for use in connection with the primary control of the vehicle (e.g., components 240, 242 and 244 discussed below in connection with FIG. 3). For example, in some implementations, module 212 may have access to the same mapping data utilized by each vehicle, e.g., as provided by a relative atlas system as described above, as well as to similar layout functionality as is used by each vehicle to lay out mapping data in the immediate vicinity of a vehicle. By doing so, module 212 may effectively reconstruct a digital map of at least the fixed objects in the vicinity around a vehicle without having to receive the entire digital map from the vehicle itself, thereby reducing the volume of data streamed by the vehicle for the purpose of reconstructing the environment around the vehicle. In some implementations, the vehicle may provide a current pose of the vehicle as well as data regarding any dynamic entities detected by the perception system (e.g., other vehicles, pedestrians, or other actors or objects detected in the environment but not represented in the mapping data), and from this more limited amount of data, a graphical depiction of the immediate vicinity around a vehicle may be generated for display to a teleoperations operator. In some implementations, autonomy components may also replicate functionality implemented in vehicle 202 to enable local assessment of how a vehicle may respond to certain directives from the teleoperations system, and in some implementations, autonomy components may have similar functionality to that implemented in vehicle 202, but with greater capabilities and/or access to greater computing resources than may be available in the vehicle.

Moreover, in some implementations, a teleoperations system may be autonomous in nature as well, whereby the teleoperations system is effectively the teleoperations operator with which an autonomous vehicle interacts during a teleoperations session. In such instances, the teleoperations system may assess the current context of an autonomous vehicle and send commands, requests, directives, suggestions, etc. for addressing any conditions that triggered a teleoperations session. In some implementations, for example, a teleoperations system may have access to substantially more compute power than can practically be provided onboard an autonomous vehicle, and thus the teleoperations system may be capable of performing computationally complex evaluations to assist an autonomous vehicle.

Teleoperations system 204 may also include an operations/fleet interface 230 to facilitate communication with other services that support autonomous vehicles. For example, it may be desirable in some implementations to provide an ability to request roadside assistance or recovery of an autonomous vehicle, or to provide log data for use in diagnosing vehicle issues. It may also be desirable to propagate data collected during a teleoperations session (e.g., data related to lane closures, detected construction or incidents, etc.) to other vehicles in a fleet. Moreover, data received and/or generated by the teleoperations system may be used as training data for further training various components of an autonomous vehicle, e.g., to improve the performance of a detector and reduce the occurrence of false positives, or to improve scenario selection and other decisions made by the autonomous vehicle in response to certain sensor input. Other external services may also interface with a teleoperations system in other implementations, as well be apparent to those of ordinary skill having the benefit of the instant disclosure.

Figure 3:
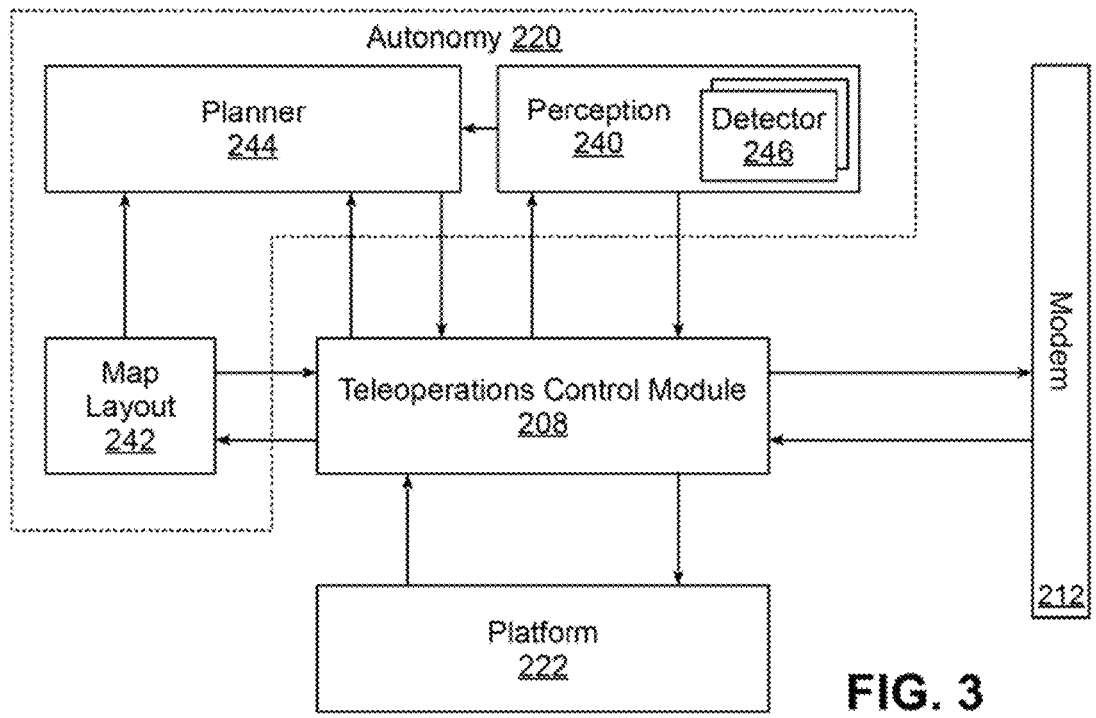
FIG. 3 is a block diagram further illustrating the teleoperations control module referenced in FIG. 2.

Now turning to FIG. 3, an example implementation of teleoperations control module 208 and the various interfaces supported thereby are illustrated in greater detail. In some implementations, for example, module 208 may include interfaces, e.g., Application Programming Interfaces (APIs) to teleoperations system 204 (via modem 212), to platform 222, and to each of a perception component 240, map layout component 242, and planner component 244 of autonomy component 220.

For the interface with teleoperations system 204, teleoperations control module 208 may be configured to communicate autonomy data (e.g., mapping data, perception data, route data, planning data), sensor data, telemetry data, etc. to teleoperations system 204 to provide the teleoperations system with the current status of the vehicle. Teleoperations control module 208 may also be configured to communicate various teleoperations requests to teleoperations system 204 and receive various teleoperations commands therefrom. Further, teleoperations control module 208 may be configured to receive requests for visualizations and communicate requested visualizations to teleoperations system 204.

Moreover, in some implementations it may be desirable to exchange heartbeat messages between teleoperations control module 208 and teleoperations system 204 to maintain an active connection between the autonomous vehicle and the teleoperations system. If, for example, due to loss of network connectivity, a failure of an autonomous vehicle to receive a heartbeat message from the teleoperations system within a defined time period or a failure of the teleoperations system to receive a heartbeat message from an autonomous vehicle within a defined period of time, it may be desirable in some implementations to take corrective action as a result of a lack of communication between the autonomous vehicle and the teleoperations system. From the perspective of the autonomous vehicle, it may be desirable to perform a controlled stop of the vehicle, while from the perspective of the teleoperations system it may be desirable to alert operations or fleet management.

For the interface with platform 222, teleoperations control module 208 may be configured to receive vehicle state information from the platform (e.g., various types of diagnostic and/or sensor data), and to issue various lower level commands to the platform, e.g., to honk a horn, activate or deactivate hazard lights, change gears, decommission the vehicle, initiate a controlled stop, etc.

For the interface with perception component 240, teleoperations control module 208 may be configured to receive from the perception component actors and/or tracks of actors detected in the environment, detections by various detectors 246 implemented in the perception component, and other perception-related data. All of such data may be communicated by module 208 to a teleoperations system as autonomy data. In addition, as will become more apparent below, module 208 may also communicate to perception component 240 any detector overrides generated by a teleoperations system, e.g., to indicate when a detector 246 has likely generated a false positive detection.

For the interface with map layout component 242, teleoperations control module 208 may receive, for example, local map data, route data and other mapping-related data from map layout component 242. Module 208 may also, in some instances, communicate map patches to map layout component 242, e.g., to generate lane closures, traffic device overrides, new destinations, virtual path suggestions, etc., or to clear out prior generated map patches applied to the local map stored in component 242, e.g., when a prior lane closure has been removed. Map layout component 242 may also, in some instances, forward map and route updates to planner component 244 to update scenarios being contemplated by the planner component during the operation of the autonomous vehicle.

For the interface with planner component 244, teleoperations control module 208 may receive, for example, generated plans, actor properties, alternate scenarios and other planning-related data. Teleoperations control module 208 may also forward various teleoperations commands to planner component 244, as well as receive teleoperations requests and/or feedback to teleoperations commands from planner component 244.

Figure 4:
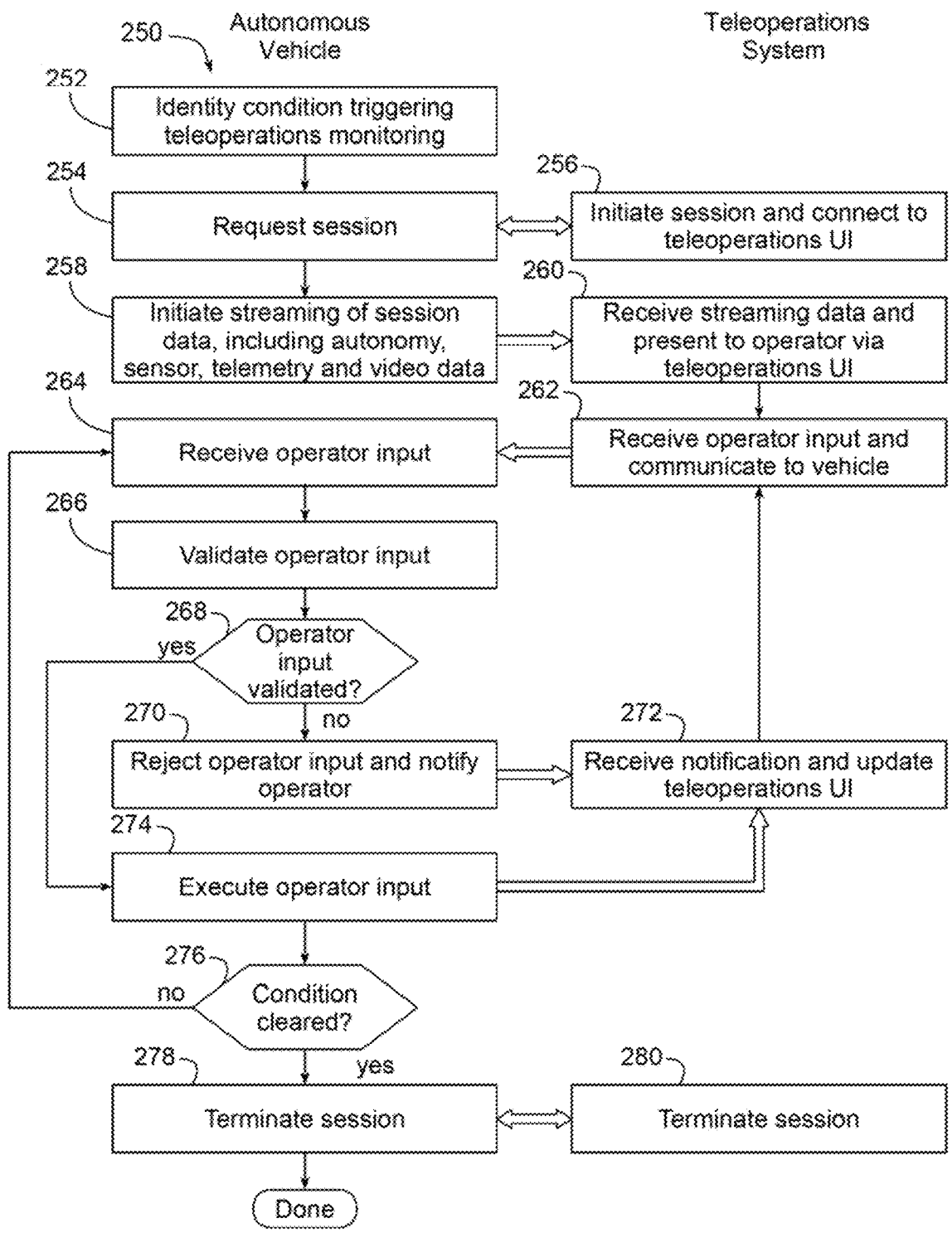
FIG. 4 is a flowchart illustrating an example sequence of operations for conducting a teleoperations session in the system of FIGS. 2-3.

Now turning to FIG. 4, while in some implementations, interaction between a teleoperations system and an autonomous vehicle may be continuous (e.g., whenever a vehicle is operating), in the illustrated implementation interaction between a teleoperations system and an autonomous vehicle is managed through interactive sessions that are initiated on-demand, often (although not necessarily exclusively) upon the request of an autonomous vehicle. FIG. 4 illustrates a sequence of operations 250, for example, that manages an interactive session between an autonomous vehicle and a teleoperations system. Operations performed within the autonomous vehicle are illustrated on the left side of the figure and operations performed within the teleoperations system are illustrated on the right side of the figure.

As illustrated in block 252, an autonomous vehicle may initially detect a condition that triggers a desire for teleoperations monitoring. As will become more apparent below, a condition may include, for example, a detection by a detector in a perception component, a request from a planner component for assistance with selection of a suitable scenario or path given current circumstances, a request initiated by a vehicle occupant, an error condition detected in the autonomous vehicle, or in other situations where teleoperations assistance may be desired. A non-exclusive list of potential conditions that may be sensed and used to trigger monitoring includes construction zones, temporary traffic devices, authorities directing traffic, loading or unloading school buses, emergency vehicles, the placement of signs, cones, or flares, crossing guards, funeral processions, collisions, inoperative traffic devices, etc. A condition that triggers a teleoperations session may also be based upon a scheduled time, a scheduled location (e.g., based upon the vehicle being at or proximate a particular geographical location, similar to a location-based reminder), or based upon a condition detected by another autonomous vehicle.

For example, it may be desirable in some implementations to automatically initiate teleoperations sessions with a vehicle in order to reassess certain conditions that have previously been detected, whether by the same autonomous vehicle or by other autonomous vehicles. One non-limiting example is that of a closed or rerouted lane that has been detected by an autonomous vehicle, and that during an initial teleoperations session results in the lane being marked closed to future travel. In some instances, the information about the closed lane condition may be propagated to other autonomous vehicles so that the other vehicles can be properly directed within another lane or to an entirely different road. Moreover, it may be desirable to automatically initiate a teleoperations session the next time the autonomous vehicle is at the same location, or even if another autonomous vehicle is in the same location, to enable a teleoperations systems operator to reassess the lane closure to determine if the original condition still exists. If the lane closure has been cleared, for example, this information may be propagated to other vehicles so that the other vehicles will no longer be directed around the previously-closed lane.

Now returning to FIG. 4, in response to detection of the condition, block 254 may communicate with the teleoperations service to request a session, which in block 256 initiates the session and connects the vehicle with an operator via a teleoperations user interface. It will be appreciated that at this time various routing decisions may be made to select an appropriate operator to interact with a vehicle, e.g., based upon operator availability (e.g., select only from among operators that are not currently in a session with another vehicle), operator expertise (e.g., select only from among operators having specific expertise with a particular condition or vehicle), operator responsibility (e.g., select only from among operators assigned to a particular fleet or set of vehicles), operator history (e.g., prioritize an operator that has previously been working with this particular vehicle), etc.

Once a session has been initiated, the autonomous vehicle may initiate streaming of session data in block 258. In some implementations, the session data can include autonomy data, sensor data, telemetry data and video data. The teleoperations system may receive the streamed session data and present the session data to the operator via the teleoperations user interface in block 260. The autonomy data may include, for example, various data associated with the current state of the vehicle or the current state of a control system for the vehicle. The autonomy data may include data related to states of detected conditions, plans, actors, actor paths, poses, scenarios, paths of the vehicle, etc. The sensor data may include, for example, data captured from various sensors such as radar, LIDAR, etc. In some implementations, the sensor data can also include image or video data obtained from one or more cameras. The telemetry data may include, for example, speed, location, acceleration, direction, etc., as well as various status information regarding the vehicle itself, e.g., various engine or motor data, fuel or charge data, or practically any other data that may be available from a vehicle. Video data may include, for example, streamed images captured by one or more cameras on the vehicle, e.g., to provide a visual look at the environment surrounding a vehicle (also referred to herein as "camera feed data"), as well as other image-related data such as historical or otherwise previously-stored video or still images. The session data that is streamed by the vehicle may otherwise include any type of data that assists a teleoperations operator with obtaining situational awareness regarding the current condition of the vehicle.

Thereafter, once presented with the session data, an operator may (i) generate one or more inputs that attempt to address the condition that triggered the session and (ii) communicate those inputs to the vehicle in block 262. The inputs may request additional data from a vehicle, may include one or more commands that instruct the vehicle to take a certain action, or may otherwise interact with the vehicle in order to address the condition.

Next, in block 264, the vehicle receives operator input, and block 266 validates the operator input. As noted above, in the illustrated implementation, an indirect control methodology is utilized whereby a teleoperations operator generally provides commands representing recommendations to an autonomous vehicle, which are then processed by the vehicle to implement those commands if appropriate. A recommendation refers to a high level directive provided to an autonomous vehicle. Based on the recommendation that is a high level directive, the autonomous vehicle control system may determine and execute a particular operation to control the autonomous vehicle rather than directly controlling the autonomous vehicle with the recommendation. For example, instead of providing, from a teleoperations system to the autonomous vehicle control system, commands specifying specific velocities, steering angles, and brake controls, recommendations such as "change lanes," "follow a suggested path," and "disregard a sensed condition" can be provided from a teleoperations system to an autonomous vehicle control system such that the autonomous vehicle control system can determine a particular operation such as specific velocities, steering angles, and brake controls to implement the recommendation. In these implementations, by providing the recommendations rather than the specific commands, less data may be transferred between the teleoperations system and the autonomous vehicle control system such that fewer network resources may be used.

In connection with processing those commands, the vehicle may validate those commands to ensure that the commands may be implemented without violating any constraints placed on the vehicle for performance and/or safety reasons. As an example, it may be desirable in some implementations to prohibit a teleoperations operator from recommending a path that would violate any boundaries established in mapping data (e.g., a boundary that prohibits a vehicle from using the shoulder of the road as a regular lane during normal operation).

In some implementations, it may also be desirable to delay or prohibit execution of commands until it is deemed safe for a vehicle to do so, e.g., based upon any perception constraints for the autonomous vehicle. For example, if a vehicle were to receive a directive to drive around an obstruction in a lane by driving into a lane that is primarily used for traffic in the opposite direction (e.g., to drive on the other side of a two-lane road), the vehicle may delay executing the directive until the perception component of the autonomous vehicle determines that the lane is free of traffic and/or pedestrians.

In some implementations, an autonomous vehicle, even in response to operator input from a teleoperations system, may effectively override and reject such input based upon one or more of operational constraints placed on the autonomous vehicle and current conditions sensed by the autonomous vehicle. Then, a notification indicating that the operator input from the teleoperations system is rejected can be provided from the autonomous vehicle to the teleoperations system. For example, where the operator input indicates honking the horn, an autonomous vehicle control system of an autonomous vehicle can determine not to honk the horn based on current conditions where the current conditions indicate that the autonomous vehicle is located in is a quiet residence area at midnight, or if other conditions exist such that the autonomous vehicle rejects the indication to honk the vehicle horn from the teleoperations system. In addition, the autonomous vehicle can send a notification of this rejection to the teleoperations system such that an operator can be notified that the operator input is rejected. In some implementations, this notification can be shared with other operators using the teleoperations system.

Thus, in response to the validation performed in block 266, block 268 may determine whether the operator input was validated. If not, control passes to block 270 to reject the operator input and notify the operator. This notification is received by the teleoperations system in block 272 and the teleoperations user interface is updated to reflect the rejection. Control then returns to block 262 to wait for additional input from the operator.

Returning to block 268, if the operator input has been validated, control passes to block 274 to execute the operator input. In some implementations, an autonomous vehicle can follow a path or scenario recommended by the operator input and execute particular operations to implement the path or the scenario. Once the autonomous vehicle system executes the operator input, the result of the execution can be updated to the teleoperations user interface. For example, the teleoperations user interface can be updated and show that the autonomous vehicle follows a particular path as recommended by the operator input.

Control then passes to block 276 to determine whether the condition that triggered the session has been cleared (e.g., when it is determined that a detector has been cleared, that an obstruction or other uncertainty detected by the vehicle has been resolved, etc.), and if not, control returns to block 264 to await further operator input (note that streaming of data continues to occur during this time so that the operator is provided with up-to-date information on the current status of the vehicle). If, however, the condition has been cleared, block 276 passes control to blocks 278 and 280 to terminate the session, whereby the vehicle interacts with the teleoperations system to discontinue the session on each end. In other instances, however, it may be desirable to wait and have an operator terminate a session rather than have the vehicle itself determine when the session is ready to be terminated.

As noted above, it may be desirable to utilize teleoperations support for a vehicle other than based upon conditions detected by the vehicle. For example, it may be desirable to initiate sessions whenever a vehicle transitions from a standby mode (e.g., where the vehicle is parked and idle) to any other mode (e.g., enroute, loading, unloading, or teleoperations modes) to ensure that an operator can view the environment surrounding the vehicle before the vehicle transitions. It will be appreciated, for example, that if a vehicle has been shut off for any appreciable amount of time, activities may have occurred while the vehicle was shut off that were not sensed by the vehicle, so a review by an operator prior to transitioning the vehicle may be desirable in some instances.

In addition, it may also be the case that an operator may monitor an autonomous vehicle continuously in some implementations, and may be able to initiate a session in response to circumstances that the vehicle may itself not detect, e.g., funeral processions, other vehicle collisions, vehicle collisions with actors that are not sensed by the vehicle, when a vehicle is creating a nuisance, etc.

Figure 5:
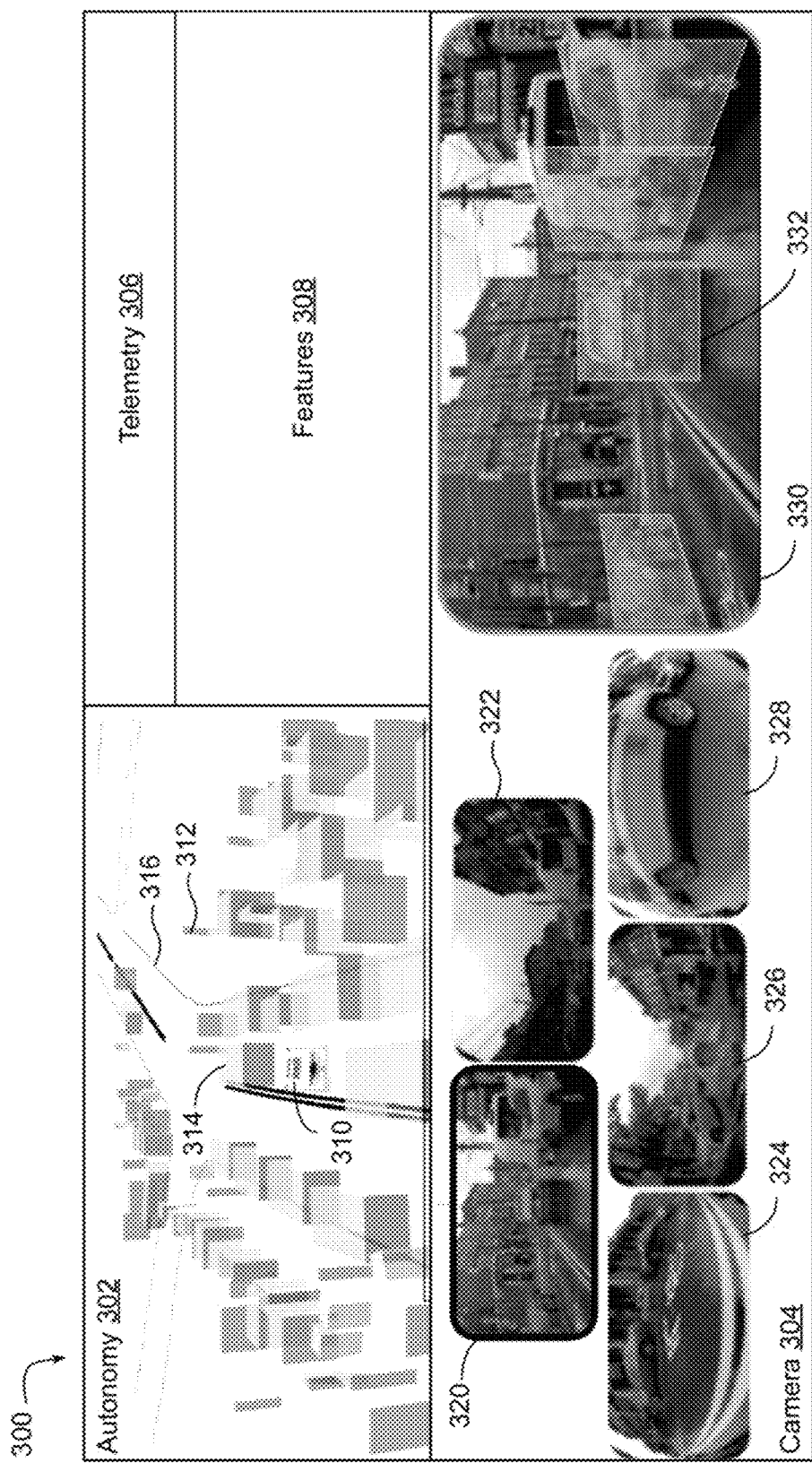
FIG. 5 illustrates an example teleoperations user interface for the system of FIGS. 2-3.

Now turning to FIG. 5, an example user interface that may be displayed to an teleoperations system operator, e.g., via a touchscreen or non-touch screen computer display, a mobile device display, or other suitable display technology, is illustrated at 300. In this example user interface, four panels 302-308 are utilized, including an autonomy panel 302, a camera panel 304, a telemetry panel 306 and a features panel 308.

Autonomy panel 302 may be used to display information from the autonomy component of an autonomous vehicle and reflecting the environment in which the vehicle is currently operating, including, for example, graphical depictions of the vehicle, its current path or trajectory, its current intended actions (e.g., stop, merge, follow, etc.), the boundaries, lanes, elements etc. of the road upon which it is operating, the fixed objects (e.g., buildings) within the environment, the dynamic objects or actors (e.g., pedestrians, bicycles, other vehicles, etc.) and/or their projected paths within the environment, ephemeral objects, etc. In some implementations, the same mapping data may be available to the teleoperations system as the autonomous vehicle, however, so a substantial portion of the data used to generate the visualization depicted in autonomy panel 302 (e.g., the road and fixed objects in the vehicle's environment) may be determined locally by the teleoperations system rather than by communicating that data from the vehicle to the teleoperations system, thereby reducing the bandwidth required to generate the visualization.

FIG. 5, for example, illustrates an example three-dimensional overhead following view for autonomy panel 302 including a graphical representation of an autonomous vehicle 310 as well as graphical representations of static objects in the environment (e.g., buildings 312), dynamic objects or actors in the environment (e.g., vehicle 314), and various boundaries in the environment (e.g., road boundary 316). Additional information, e.g., various paths or tracks of the vehicle and/or the dynamic objects, traffic lights and/or traffic light states, or any other information capable of supplementing a teleoperations system operator's situational awareness, may also be displayed in such a view.

Camera panel 304 may be used to display video data captured by one or more cameras disposed on the vehicle and streamed to the teleoperations system, thereby enabling an operator to view the vehicle's current environment and enhancing an operator's situational awareness. In the illustrated implementation, five cameras may be used, e.g., a forward-looking traffic light camera with a 120 degree field of view to provide situational awareness when loading/unloading a vehicle or to monitor traffic light state when enroute, along with four fisheye cameras with 180 degree fields of view and directed in forward, rear, left and right directions to provide situational awareness and/or to locate blocking objects surrounding the vehicle. In some implementations, an interior camera may also be used, as may other types of cameras for which situational awareness for a teleoperations operator would be improved. An example display of a forward-looking traffic light camera is illustrated at 320, while displays of forward, left, rear and right fisheye cameras are illustrated at 322, 324, 326 and 328. Other combinations of cameras, including fewer or greater numbers of cameras, may be used in other implementations, as well as different types of cameras having differing fields of view, differing resolution and/or different capabilities. For some types of longer vehicles, e.g., buses, trucks, etc., for example, additional side view cameras may be used to provide adequate coverage over the full lengths of such vehicles.

In some implementations, and as will become more apparent below, it may be desirable to highlight a particular camera feed, e.g., in a separate enlarged display 330, based upon a context of the vehicle and/or based on an operator's preference. Display 330, for example, illustrates an enlarged view of the traffic light camera feed, and it will be appreciated that the border of display 320 is highlighted to indicate this relationship.

In addition, in some implementations, any of displays 320-330 may be annotated with autonomy-related information, e.g., as represented by boxes 332 in display 330 that illustrate the extents of various actors in the vicinity of the vehicle. The autonomy-related information may be overlaid by the teleoperations system in some implementations, e.g., based upon the autonomy data received from the vehicle and used to generate the autonomy panel, while in other implementations the autonomy-related information may be integrated into the video data of a camera feed by the vehicle prior to communicating the video data to the teleoperations system, e.g., by painting or drawing boxes 332 or other textual and/or graphical elements onto the frames of the video data prior to communicating the video data to the teleoperations system.

In some implementations, an operator may select different camera feeds to present in display 330, e.g., by touching or clicking on one of displays 320-328. Further, in some implementations, a current context of the vehicle, determined either by the vehicle or the teleoperations system, may be used to select which camera feed is presented in display 330. For example, where a teleoperations session is initiated due to an obstruction detected on the right side of the vehicle, it may be desirable to initially present the camera feed for the right side fisheye camera in display 330.

Telemetry panel 306 may be used to display basic information about the vehicle, including, for example, speed, fuel or charge level, autonomy state, and any detected vehicle or autonomy system faults. Features panel 308 may be used to display various information and controls to be used by a teleoperations system operator to interact with the vehicle and provide commands, requests, directions or other feedback to the vehicle. While features panel 308 may concurrently support all of the possible interactions between an operator and a vehicle in some implementations, in other implementations it may be desirable to dynamically update features panel 308 to support different interactions based upon the context of the vehicle and/or input from the operator.

It will be appreciated that different arrangements, sizes, numbers, and layouts of panels and displays may be used in a teleoperations user interface in other implementations, and that more or less data and types of data may be presented to an operator through such an interface. In some implementations, a user interface may be configurable by an operator (e.g., to suit an operator's personal preferences). In some implementations, a user interface may be dynamically modified by the teleoperations system based upon contextual information (e.g., to enhance situational awareness by displaying or highlighting data that is most relevant to a particular situation). Other user interfaces and/or form factors may be used to interact with an operator in other implementations as well, e.g., using various input devices such as keyboards, mice, etc., using voice input, gesture input, touch input, etc. Therefore, the invention is not limited to the particular user interface implementations discussed herein.

Scenario Selection

The planning system of an autonomous vehicle (also referred to as a motion planning system) is generally responsible for planning a path of motion for the autonomous vehicle over some timeframe given a desired destination as well as the static and moving objects within the environment. In many implementations, this planning is based in part upon selection between multiple possible scenarios, and the section generally takes into account, for each possible scenario, whether that scenario is valid, and if so, the relative desirability of that scenario compared to other valid scenarios. A scenario, in this regard, may be considered to include one or more decisions that together may be used to generate a potential path of motion for an autonomous vehicle over the near term. A scenario, in some instances, may also define other aspects related to motion or operation of an autonomous vehicle, including, for example, velocity, acceleration/deceleration, actuation of various vehicle components, etc., and in some instances, scenarios may be used by various components or systems of an autonomous vehicle control system. In some instances, for example, scenarios also referred to herein as motion planning scenarios may be used by a motion planning component or system when planning a path of motion for an autonomous vehicle.

A scenario may be considered to be valid when it has been validated by the autonomous vehicle as meeting current constraints on the vehicle, e.g., in terms of producing a path that does not violate any mapping constraints that restrict vehicle travel within a geographical area and/or any perception constraints that restrict vehicle travel based upon static and/or dynamic objects or actors sensed within the vicinity of the vehicle. A mapping constraint, as one example, may be based upon a boundary established for a roadway that limits vehicle travel beyond that boundary, or may be based upon any other mapping data that places a restriction on where a vehicle is or is not allowed to travel. A perception constraint, as one example, may be based upon sensing a moving or stationary vehicle or pedestrian in the vicinity of the vehicle, based upon sensing the state of an upcoming traffic light, etc.

A scenario may be considered to be desirable when it has been determined to achieve a desired goal more effectively and efficiently than other valid scenarios that have been proposed. As one example, where a vehicle is traveling in one lane with heavier traffic and slower speeds than an available adjacent lane, and there are no upcoming static or dynamic objects in the other lane, a scenario that proposes a lane change into the adjacent lane may be determined to be more desirable than another scenario that proposes continued travel at a reduced speed in the same lane.

Therefore, in the illustrated implementations, multiple scenarios may be generated and selected from by the autonomous vehicle in order to produce a path of motion that is desirably the optimal choice from among the generated scenarios. In addition, in some implementations, it may be desirable to maintain and track multiple scenarios over time and potentially select a different scenario if current conditions have changed.

It will be appreciated, however, that selection of an optimal scenario may be dependent on a large number of factors in some instances. Furthermore, in some cases, determining whether one scenario is objectively superior than another may not be clear, or even possible. As one example, if an autonomous vehicle is following a large truck and the truck has come to a complete stop and has been stopped for an extended period of time, it may be difficult to determine whether the truck is merely waiting at a stop light, is waiting behind a line of slowed or stopped traffic, is parked, or is disabled.

Accordingly, in some implementations it may be desirable to provide teleoperations support to assist an autonomous vehicle with scenario selection such that a teleoperations system operator, when provided with sufficient context data regarding an autonomous vehicle to provide situational awareness to the operator, can select an appropriate scenario from among a set of available scenarios initially generated by the autonomous vehicle and communicated to the teleoperations system, and thereby cause the autonomous vehicle to execute the selected scenario.

Furthermore, it will be appreciated that in some implementations, an autonomous vehicle may validate selected scenarios prior to execution, thereby ensuring that the scenarios may be executed without violating any constraints placed on the vehicle for performance and/or safety reasons, including mapping constraints that may restrict vehicle travel within a geographical area, as well as perception constraints that may exist, e.g., as a result of any static or dynamic objects in the vicinity of the vehicle or other events detected proximate the vehicle.

It may also be desirable in some implementations to provide a user interface to a teleoperations system operator to facilitate rapid comprehension and selection of an appropriate scenario by the operator. In some implementations, for example, it may be desirable to visually associate individual user controls in a user interface with different scenarios, e.g., using corresponding colors or patterns for the user controls and the display representations of the associated scenarios. Further, in some implementations, an overhead map view presented in a graphical display representation may include a graphical representation of the autonomous vehicle, a graphical representation of one or more static objects in the environment in which the autonomous vehicle is operating, a graphical representation of one or more dynamic objects in the environment in which the autonomous vehicle is operating, a graphical representation of one or more boundaries in the environment in which the autonomous vehicle is operating, and in some instances, a graphical representation of a path or track associated with each of multiple available scenarios.

Now turning to FIG. 6, this figure illustrates an example implementation of a motion planning process performed by a motion planning component 340, e.g., similar to planning subsystem 154 of FIG. 1. Motion planning component 340 includes a decision/scenario generation sub-component 342, an optimizer sub-component 344, a validation sub-component 346, and a ranking sub-component 348. Decision/scenario generation sub-component 342 may be used, for example, to generate multiple scenarios, while optimizer sub-component 344 may be used to optimize each scenario and generate a vehicle path therefor. Validation sub-component 346 may be used to validate each scenario against various vehicle constraints, while ranking sub-component 348 may be used to rank each scenario, e.g., to prioritize each scenario based upon its desirability, or fitness to efficiently and effectively implement a desired goal.

FIG. 6 also illustrates four example scenarios, each implementing one or more decisions, that may be generated by decision/scenario generation sub-component 342 in response to a particular current context of the vehicle. The current context is illustrated in FIG. 7, which represents an implementation of feature panel 308 of FIG. 5. In this implementation of feature panel 308, a map sub-panel 350 is displayed alongside an actions sub-panel 352.

Map sub-panel 350 illustrates an overhead view of the vehicle and its environment, and may include, for example, a graphical representation of the autonomous vehicle 354, graphical representations of various other dynamic objects or actors (e.g., vehicle 356), graphical representations of various boundaries (e.g., lane boundary 358), and graphical representations 360, 362 and 364 of current and/or potential vehicle scenarios (e.g., current scenario 360 and potential scenarios 362 and 364). In this current context, the autonomous vehicle is depicted as being on a two way street with one lane in each direction, with parked vehicles to the right of the lane within which the autonomous vehicle is positioned, and with another vehicle in front of the autonomous vehicle and currently stopped.

Returning to FIG. 6, consider that decision/scenario generation sub-component 342 may generate four potential scenarios. A first, referred to as a "nudge left" scenario, proposes to steer the autonomous vehicle around to the left of the stopped vehicle, while a second, referred to as a "nudge right" scenario, proposes to steer the autonomous vehicle around to the right of the stopped vehicle. A third, referred to as an "ACC follow" scenario, proposes to maintain a course in the current lane and follow the stopped vehicle once it begins moving again, while maintaining a suitable following distance using Adaptive Cruise Control (ACC). A fourth, referred to as a "change lane" scenario, proposes to steer the autonomous vehicle into the opposite lane and continue travel within that lane.

Optimizer sub-component 344 may then generate corresponding paths or tracks for each scenario (labeled paths W, X, Y and Z), and validation sub-component 346 may attempt to validate each of the scenarios. For example, based upon the current context depicted in map sub-panel 350, the nudge left scenario may be successfully validated, e.g., if no oncoming traffic is detected, no pedestrians are detected, and it is considered acceptable for the vehicle to travel a short distance in the opposite lane to avoid an obstruction. Similarly, the ACC follow scenario may also be validated, as it may be considered acceptable for the vehicle to maintain its current position in its lane until the obstruction clears.

On the other hand, the nudge right scenario may be rejected by validation sub-component 346 due to the presence of parked vehicles to the right of the autonomous vehicle, and the change lane scenario may be rejected, e.g., based upon the fact that the opposite lane is used for opposite-direction traffic.

Ranking sub-component 348 may then rank the scenarios, and may choose, for example, to rank the ACC follow scenario first, the nudge left scenario second, the nudge right scenario third, and the change lane scenario fourth. For example, it may be determined that, based on the relatively short amount of time the autonomous vehicle has been stopped, it may be likely that the stopped vehicle will resume its forward motion, so it may be desirable to rank the ACC follow scenario above the nudge left scenario. In addition, based upon this ranking, motion planning component 340 may begin to execute (or if already executing, continue to execute) the highest ranked and validated ACC follow scenario.

Returning to FIG. 7, continuing with the example, assume that the autonomous vehicle determines that a teleoperations session is desirable, or that a teleoperations session is otherwise active, the autonomous vehicle may communicate a set of scenarios to the teleoperations system, e.g., the nudge left and ACC follow scenarios that have been successfully validated by motion planning component 340, and as a result, a graphical representation 360 may be used to represent a track or path for the ACC follow scenario, while a graphical representation 362 may be used to represent a track or path for the nudge left scenario.

Furthermore, in some implementations graphical representations of other scenarios than those communicated by the autonomous vehicle may be presented. In some implementations, for example, it may be desirable to support one or more default scenarios that may always be enabled. In some implementations, for example, a stop and hold scenario may be supported, which causes a vehicle to stop at its current position and remain in place. Graphical representation 364, for example, illustrates a path for a stop and hold scenario. It may also be desirable to support other scenarios that are available in certain contexts, e.g., a release hold scenario that enables an operator to release a prior stop and hold. Other scenarios may also be supported in other implementations, as will be appreciated by those of ordinary skill having the benefit of the instant disclosure.

Actions sub-panel 352 may include a number of user interface controls, i.e., scenario selection controls 366, 368 and 370 associated with different scenarios available for selection by a teleoperations system operator. Control 366, for example, is associated with a current scenario, here the ACC follow scenario. Controls 368 and 370 are associated with other valid scenarios capable of being selected by an operator, here the nudge left scenario (control 368) and the stop and hold scenario (control 370).

Notably, in the illustrated implementation, each control 366-370 is visually associated with its associated scenario, e.g., using corresponding colors or patterns for each control 366-370 and its associated scenario graphical representation 360-364. As such, an operator is able to rapidly ascertain, once a particular scenario is chosen, which control should be actuated in order to select that scenario.

Each control 366-370 in the illustrated implementation is implemented as a slider control that may be activated by swiping right to left, e.g., by clicking or touching the "confirm" button on control 366 for the current scenario and dragging it to the left, or by clicking or touching the "select" button on control 368 or 370 for the respective nudge left or stop and hold scenario and dragging it to the left. By doing so, the associated scenario is confirmed or selected, and the vehicle is notified to update its scenarios list and ranking accordingly.

It will be appreciated that a slider control is generally simple to actuate, so that when a teleoperations system operator has determined that a particular scenario should be chosen, the operator can readily select that scenario. A wide variety of alternate controls may be used as a scenario selection control in other implementations, including graphical buttons, voice or gesture inputs, etc. In addition, rather than selecting a scenario with one user input, in other implementations multiple inputs may be used, e.g., to open a window to view additional information about a scenario prior to selecting that scenario, to provide additional input options to issue other commands to the vehicle, etc.

Figure 8:
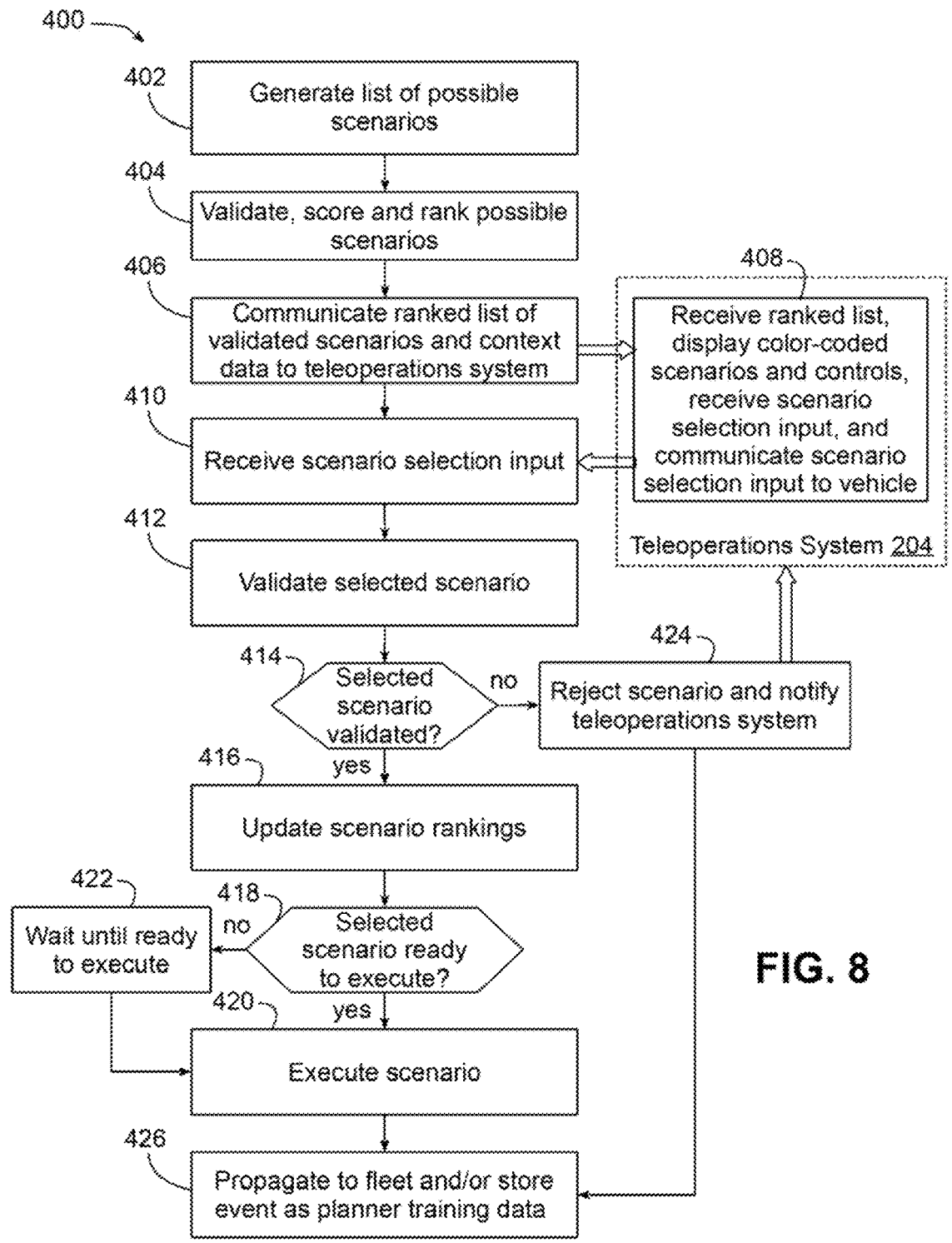
FIG. 8 is a flowchart illustrating an example sequence of operations for selecting a scenario in the system of FIGS. 2-3.

Now turning to FIG. 8, an example sequence of operations 400 for selecting a scenario with a teleoperations system or service is illustrated in greater detail. In block 402, the autonomous vehicle may generate a list of possible scenarios, and in block 404, those scenarios may be validated, scored and ranked, e.g., in the manner discussed above in connection with FIG. 6. Next, in block 406, a ranked list of the validated scenarios may be communicated to the teleoperations system, which in block 408 receives the ranked list, displays color-coded scenarios and controls (e.g., as discussed above in connection with FIG. 7), receives a scenario selection input from a teleoperations system operator, and communicates the scenario selection input back to the autonomous vehicle. It will be appreciated that before and/or after communicating the possible scenarios to the teleoperations system, additional context data may also be streamed to the teleoperations system in the manner described above to provide the teleoperations system operator with situational awareness suitable to enable the operator to assess the current context of the vehicle and choose an appropriate scenario accordingly.

Next, in block 410, the autonomous vehicle receives the scenario selection input from the teleoperations system, and in block 412, the autonomous vehicle validates the selected scenario, e.g., in the manner discussed above. It should be noted that, while in the illustrated implementation, each scenario communicated to the teleoperations system has already been validated, the current context of the vehicle may have changed over the duration between the prior validation and receiving the scenario selection input, so revalidating the scenario prior to execution ensures that the scenario is still suitable for execution. Likewise, if a selected scenario was not initially generated by the vehicle (e.g., in the case of a stop and hold or a release hold), validation is desired because the autonomous vehicle has yet to validate that scenario. Moreover, in some implementations an autonomous vehicle may begin executing one scenario after communicating possible scenarios to the teleoperations system, resulting in a selected scenario potentially contradicting the currently-executing scenario. For example, if a vehicle initiates a nudge left scenario, selection of a nudge right scenario would generally not be validated if the vehicle has already begun steering to the left.

Next, if the selected scenario is successfully validated, block 414 passes control to block 416 to update the scenario rankings (if necessary). Doing so may, in some implementations, facilitate future rankings of scenarios by the autonomous vehicle to ensure that the vehicle is biased towards continuing the scenario selected by the teleoperations system operator rather than reverting to its initial scenario. Thus, for example, as illustrated in FIG. 6, block 416 may swap the rankings of the nudge left and ACC follow scenarios in some implementations.

Returning to FIG. 8, once the scenario rankings are updated, block 418 determines whether the selected scenario is ready to execute, and if so, passes control to block 420 to execute the scenario. A scenario may be considered to be ready to execute when it is already executing, or may be considered to be ready to execute when there are no vehicle constraints restricting its immediate execution. Returning to block 418, if it is determined that the selected scenario is not yet ready to execute, control passes to block 422 to wait until the scenario is ready to be executed, and then control passes to block 420 to start executing the scenario. For example, in some implementations, a scenario may still be validated if there are pedestrians or oncoming traffic that prevent immediate execution of a scenario, so block 422 may wait until the area is clear and then release the vehicle to begin execution of the selected scenario.

Returning to block 414, if the selected scenario is not successfully validated, control may pass to block 424 to reject the scenario. In addition, it may also be desirable to notify the teleoperations system at this time so the operator is aware of the rejection, which may enable the teleoperations system operator to select another scenario or otherwise take other action.

Upon execution of either block 420 or block 424, control may pass to block 426, which represents two additional and optional operations that may be performed in sequence 400 in some implementations. In some implementations, for example, it may be desirable to propagate the scenario selection to one or more other vehicles, e.g., other vehicles entering the same geographical area. By doing so, other vehicles encountering the same conditions that triggered the scenario selection for the first vehicle may be biased to select the same scenario without initiating a teleoperations session. It will be appreciated that it will generally be desirable to limit such functionality in both time and space, as the conditions that triggered a scenario selection in one vehicle may not necessarily be the same conditions that trigger a scenario selection in another vehicle. One non-limiting example of a suitable implementation of such functionality might be where the stopped vehicle in the above-described example is disabled or parked for a long time, in which case it may be desirable to propagate the selection of a nudge left scenario to other vehicles so that when those vehicles arrive at the same location and the same vehicle is stopped in that location, they will be biased to drive around the obstruction rather than wait for it to clear.

Also, in some implementations, it may be desirable to store the scenario selection event as training data. Both the fact that a particular scenario was selected, and the associated context data for the vehicle surrounding the selection and/or whether or not that selection was validated by the vehicle may be used to improve a machine language model used by or as a motion planning component in some implementations. Thus, the teleoperations system operator may be used to effectively train and improve motion planning functionality via scenario selection decisions. In some implementations, the fact that a given scenario selected initially by the autonomous vehicle was not overridden may also serve as training data that reinforces the correct selection made by the autonomous vehicle.

It will be appreciated that an innumerable number of scenarios may be generated and proposed by an autonomous vehicle. As such, the invention is not limited to the particular scenarios discussed herein.

Other variations will be apparent to those of ordinary skill. Therefore, the invention lies in the claims hereinafter appended.

What is claimed is:

1. A method, comprising:
    generating a plurality of scenarios in an autonomous vehicle operating in an environment, wherein generating the plurality of scenarios is performed in response to an event encountered by the autonomous vehicle in a geographical area, and wherein the event triggers a session between the autonomous vehicle and a teleoperations system in communication with and remote from the autonomous vehicle;
    communicating the plurality of scenarios to the teleoperations system;

communicating to the teleoperations system context data collected by the autonomous vehicle from the environment in which the autonomous vehicle operates to provide situational awareness to an operator of the teleoperations system;

receiving from the teleoperations system a selected scenario that is selected by the operator of the teleoperations system from among at least a subset of the plurality of scenarios that are presented to the operator of the teleoperations system;

causing the autonomous vehicle to execute the selected scenario in response to receiving the selected scenario; and notifying another autonomous vehicle of the selected scenario such that the other autonomous vehicle executes the selected scenario without triggering a session between the other autonomous vehicle and the teleoperations system when the other autonomous vehicle is within the geographical area.

2. The method of claim 1, further comprising:

validating the selected scenario received from the teleoperations system in the autonomous vehicle, wherein causing the autonomous vehicle to execute the selected scenario is performed in response to successful validation of the selected scenario; and in response to unsuccessful validation of the selected scenario by the autonomous vehicle, rejecting the selected scenario in the autonomous vehicle.

3. The method of claim 2, further comprising communicating a notification of unsuccessful validation from the autonomous vehicle to the teleoperations system in response to unsuccessful validation of the selected scenario.

4. The method of claim 2, wherein validating the selected scenario includes determining if the selected scenario contradicts a different scenario being executed by the autonomous vehicle.

5. The method of claim 4, further comprising initiating execution of the different scenario by the autonomous vehicle after communicating the plurality of scenarios to the teleoperations system but before receiving the selected scenario from the teleoperations system.

6. The method of claim 2, wherein validating the selected scenario includes determining whether a path associated with the selected scenario violates any constraint associated with the autonomous vehicle.

7. The method of claim 6, wherein the constraint is a mapping constraint that restricts vehicle travel within a geographical area.

8. The method of claim 6, wherein the constraint is a perception constraint.

9. The method of claim 2, further comprising validating each scenario of the plurality of planning scenarios prior to communicating the plurality of scenarios to the teleoperations system.

10. The method of claim 1, wherein the selected scenario is different from the plurality of scenarios.

11. The method of claim 10, wherein the selected scenario is a stop and hold scenario or a release hold scenario.

12. The method of claim 1, wherein the selected scenario is selected from the plurality of scenarios.

13. The method of claim 12, wherein generating the plurality of scenarios includes ranking the plurality of scenarios, and wherein the selected scenario is of a lower rank than a top ranked scenario of the plurality of scenarios.

14. The method of claim 13, further comprising re-ranking at least a subset of the plurality of scenarios in response to receiving the selected scenario.

15. The method of claim 1, wherein generating the plurality of scenarios includes ranking the plurality of scenarios, wherein the selected scenario is of a lower rank than a top ranked scenario of the plurality of scenarios, wherein generating the plurality of scenarios is performed using a trained machine learning model, and wherein the method further comprises generating training data for the trained machine learning model in response to receiving the selected scenario that is of the lower rank than the top ranked scenario.

16. The method of claim 1, wherein communicating the context data to the teleoperations system includes communicating autonomy data, sensor data, telemetry data, or video data to the teleoperations system.

17. An autonomous vehicle control system, comprising:

a detector configured to detect a condition in an autonomous vehicle operating in an environment; and one or more processors that are configured to:

generate a plurality of scenarios in an autonomous vehicle operating in an environment, wherein generating the plurality of scenarios is performed in response to an event encountered by the autonomous vehicle in a geographical area, and wherein the event triggers a session between the autonomous vehicle and a teleoperations system in communication with and remote from the autonomous vehicle;

communicate the plurality of scenarios to the teleoperations system;

communicate to the teleoperations system context data collected by the autonomous vehicle from the environment in which the autonomous vehicle operates to provide situational awareness to an operator of the teleoperations system;

receive from the teleoperations system a selected scenario that is selected by the operator of the teleoperations system from among at least a subset of the plurality of scenarios that are presented to the operator of the teleoperations system;

cause the autonomous vehicle to execute the selected scenario in response to receiving the selected scenario; and notify another autonomous vehicle of the selected scenario such that the other autonomous vehicle executes the selected scenario without triggering a session between the other autonomous vehicle and the teleoperations system when the other autonomous vehicle is within the geographical area.

18. The autonomous vehicle control system of claim 17, wherein the one or more processors are further configured to validate the selected scenario received from the teleoperations system in the autonomous vehicle and in response to unsuccessful validation of the selected scenario by the autonomous vehicle, reject the selected scenario in the autonomous vehicle.

19. A teleoperations system that is remotely located from an autonomous vehicle and that comprises one or more processors, the one or more processors being configured to:

receive from the autonomous vehicle a plurality of scenarios generated by the autonomous vehicle, wherein the plurality of scenarios is generated in response to an event encountered by the autonomous vehicle in a geographical area, and wherein the event triggers a session between the autonomous vehicle and the teleoperations system;

present to a teleoperations system operator context data collected by the autonomous vehicle from the environment in which the autonomous vehicle operates and a graphical display representation of at least a subset of the plurality of scenarios to provide situational awareness to the teleoperations system operator;

receive input from the teleoperations system operator selecting a selected scenario from among at least a subset of the plurality of scenarios that are presented to the teleoperations system operator;

communicate the selected scenario to the autonomous vehicle to cause the autonomous vehicle to execute the selected scenario; and notify another autonomous vehicle of the selected scenario such that the other autonomous vehicle executes the selected scenario without triggering a session between the other autonomous vehicle and the teleoperations system when the other autonomous vehicle is within the geographical area.

20. The teleoperations system of claim 19, wherein the one or more processors are further configured to receive a notification of unsuccessful validation from the autonomous vehicle in response to an unsuccessful validation of the selected scenario by the autonomous vehicle.

21. The teleoperations system of claim 20, wherein the notification is received in response a determination by the autonomous vehicle that the selected scenario contradicts a different scenario being executed by the autonomous vehicle.

22. The teleoperations system of claim 20, wherein the notification is received in response a determination by the autonomous vehicle that the selected scenario violates a constraint associated with the autonomous vehicle.

23. The teleoperations system of claim 22, wherein the constraint is a mapping constraint that restricts vehicle travel within a geographical area.

24. The teleoperations system of claim 22, wherein the constraint is a perception constraint.

25. The teleoperations system of claim 19, wherein the plurality of scenarios received from the autonomous vehicle are validated by the autonomous vehicle prior to be communicated to the teleoperations system.

26. The teleoperations system of claim 19, wherein the selected scenario is a stop and hold scenario or a release hold scenario.

27. The teleoperations system of claim 19, wherein the plurality of scenarios received from the autonomous vehicle are ranked, wherein the selected scenario is of a lower rank than a top ranked scenario of the plurality of scenarios.

28. The teleoperations system of claim 19, wherein the one or more processors are configured to present the context data by presenting autonomy data, sensor data, telemetry data, or video data.

* * * * *